(12) United States Patent
Komaru

(10) Patent No.: US 11,835,346 B2
(45) Date of Patent: Dec. 5, 2023

(54) ROUTE OUTPUT APPARATUS AND METHOD

(71) Applicant: DENSO CORPORATION, Kariya (JP)

(72) Inventor: Takashi Komaru, Kariya (JP)

(73) Assignee: DENSO CORPORATION, Kariya (JP)

( * ) Notice: Subject to any disclaimer, the term of this patent is extended or adjusted under 35 U.S.C. 154(b) by 102 days.

(21) Appl. No.: 16/913,161

(22) Filed: Jun. 26, 2020

(65) Prior Publication Data

US 2020/0408539 A1    Dec. 31, 2020

(30) Foreign Application Priority Data

Jun. 28, 2019  (JP) .................................. 2019-121573

(51) Int. Cl.
*G01C 21/34*    (2006.01)

(52) U.S. Cl.
CPC .................................. *G01C 21/343* (2013.01)

(58) Field of Classification Search
CPC .................................................. G01C 21/343
See application file for complete search history.

(56) References Cited

U.S. PATENT DOCUMENTS

| | | | | |
|---|---|---|---|---|
| 2010/0332132 A1* | 12/2010 | Okude | ............ | G08G 1/096816 |
| | | | | 701/414 |
| 2011/0119311 A1* | 5/2011 | Fukuda | ................ | G09B 29/004 |
| | | | | 707/E17.05 |
| 2014/0365114 A1* | 12/2014 | van Os | .............. | G01C 21/3632 |
| | | | | 701/428 |
| 2015/0262397 A1* | 9/2015 | Eastman | .................. | G06F 18/23 |
| | | | | 345/440 |
| 2015/0338226 A1* | 11/2015 | Mason | ............... | G01C 21/3605 |
| | | | | 701/408 |
| 2016/0358021 A1* | 12/2016 | Hong | ...................... | G01C 21/34 |
| 2018/0005530 A1* | 1/2018 | Jeong | ...................... | G08G 5/065 |
| 2018/0188743 A1* | 7/2018 | Wheeler | .............. | G05D 1/0276 |
| 2019/0101402 A1* | 4/2019 | Chien | ...................... | G06F 16/29 |

FOREIGN PATENT DOCUMENTS

| | | |
|---|---|---|
| JP | 2007-292586 A | 11/2007 |
| JP | 2007292586 A * | 11/2007 |
| JP | 2018-040712 A | 3/2018 |

\* cited by examiner

*Primary Examiner* — Khoi H Tran
*Assistant Examiner* — Tristan J Greiner
(74) *Attorney, Agent, or Firm* — MASCHOFF BRENNAN

(57) ABSTRACT

In a route output apparatus, a route searcher is configured to search for a route from a designated departure point to an arrival point with use of a graph including a plurality of nodes and at least one link connecting the nodes and representing map information. A converter is configured to convert coordinates of a point on the graph identified based on a plurality of nodes representing the route searched by the route searcher into a latitude and a longitude. An outputter is configured to output the latitude and longitude calculated by the converter.

12 Claims, 18 Drawing Sheets

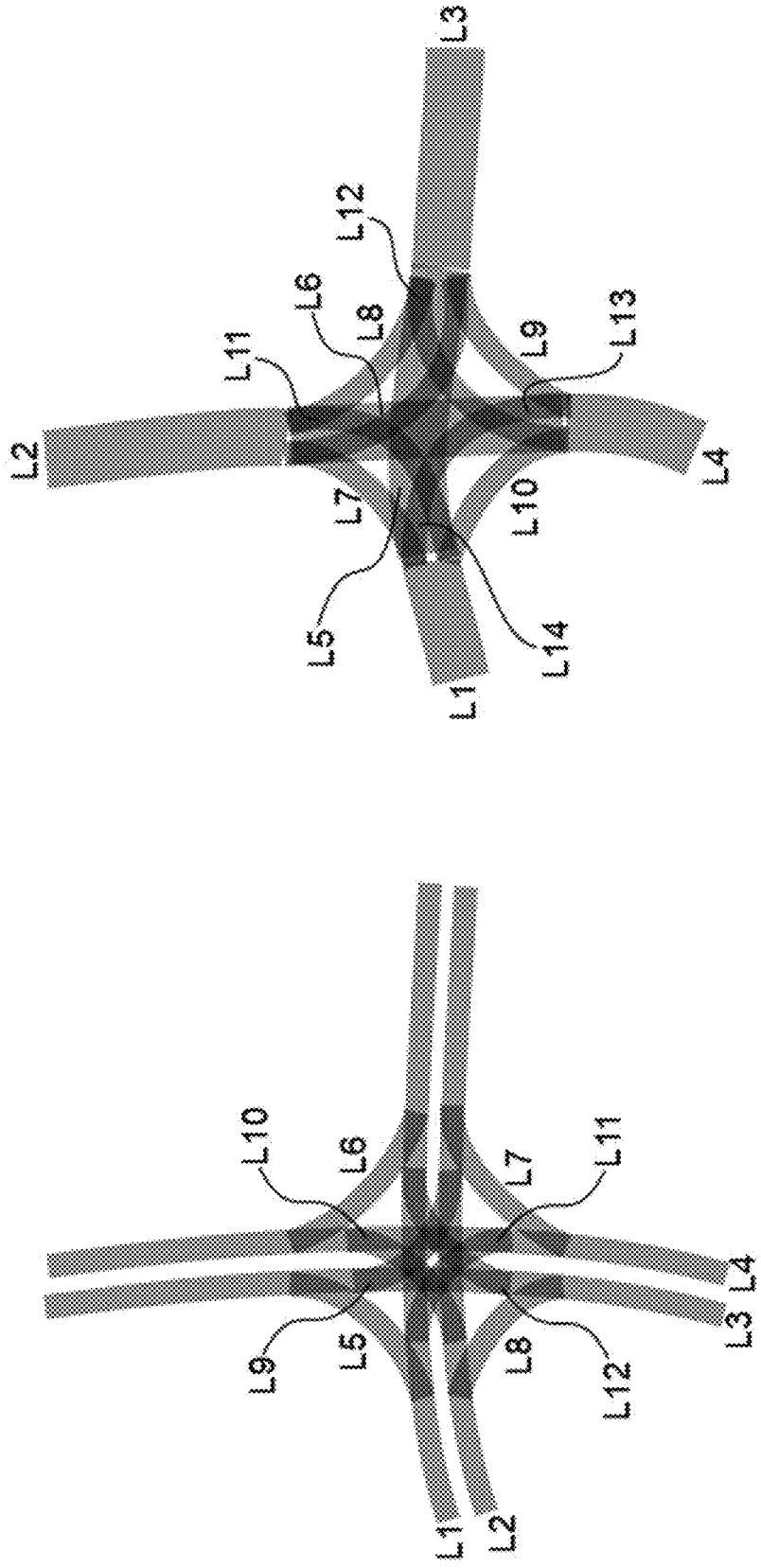

FIG.5

| | | | | 52A |
|---|---|---|---|---|
| LINK NUMBER | L1 | L2 | ... | |
| CENTER POINT GROUP LIST | [[0,0], [0,1], ...] | ... | | |
| LIST OF DIRECTION VECTORS BETWEEN CENTER POINTS | [$\vec{d_1}, \vec{d_2}, ...$] | | | |
| LANE WIDTH LIST | [3.5, 3.5] | | | |
| START-POINT-CONNECTED LINK NUMBER | L2 | | | |
| DISTANCE ALONG START-POINT-CONNECTED LINK | 20 | | | |
| END-POINT-CONNECTED LINK NUMBER | L3 | | | |
| DISTANCE ALONG END-POINT-CONNECTED LINK | 120 | | | |
| LOWER LEFT AND UPPER RIGHT CORNER COORDINATES OF CIRCUMSCRIBING GRID | [[0,0], [100, 100]] | | | |

52B

| ORIGIN LATITUDE/LONGITUDE | [35.0, 137.0] |
|---|---|

FIG.7

| NODE NUMBER | N1 | N2 | ... |
|---|---|---|---|
| COORDINATES | [0,0] | ... | |
| CONNECTION LINK LIST | [[L1, 0], [L2, 15], ...] | | |

54A

| LINK NUMBER | L1 | L2 | ... |
|---|---|---|---|
| INCLUDED NODE LIST | [[N1, 0], [N2, 20], ...] | ... | |

54B

| EDGE NUMBER | E1 | E2 | ... |
|---|---|---|---|
| START POINT NODE NUMBER | N1 | ... | |
| END POINT NODE NUMBER | N2 | | |
| DISTANCE | 20 | | |

54C

US 11,835,346 B2

ROUTE OUTPUT APPARATUS AND METHOD

CROSS-REFERENCE TO RELATED APPLICATION

This application is based on and claims the benefit of priority from earlier Japanese Patent Application No. 2019-121573 filed Jun. 28, 2019, the description of which is incorporated herein by reference.

BACKGROUND

Technical Field

The present disclosure relates to a route output technique.

Related Art

Conventionally, a route search is performed with use of a road network represented by nodes and a link connecting the nodes. For example, there has been known an apparatus that creates a proper designated route when a target designated route is designated by plural point data. In this apparatus, node data and link data are stored in a road network database, and the route instruction data file of a storage device stores route instruction data for specifying points for identifying a route to follow in such a manner that the order of following can be seen. Then, this apparatus acquires usable candidate links based on the node data and the link data for each point indicated by the route instruction data of the route instruction data file, and narrows them down to a link more suitable for use from the acquired links. In addition, when one route is found in this way, this apparatus identifies the route as an instruction route.

BRIEF DESCRIPTION OF THE DRAWINGS

In the accompanying drawings:

FIG. 4 is a diagram for explaining a case where pre-stored map information differs between apparatuses;

FIG. 5 is a diagram illustrating an example of a map DB;

FIG. 7 is a diagram illustrating an example of a graph DB;

DESCRIPTION OF SPECIFIC EMBODIMENTS

Vehicle manufacturers and IT companies are accelerating technological development for autonomous driving, and social expectations for fully autonomous driving (Lv. 5) are increasing. However, practically, autonomous driving is considered to be realized only in limited areas and conditions (Lv. 4).

Here, there is a demand for an autonomous driving center capable of controlling route instructions or the like for an autonomous vehicle so as to prevent the vehicle from traveling outside the limited areas and conditions. It is desirable for the center to be able to centrally control a large number of autonomous vehicles regardless of the types of hardware and software installed to make more advanced determinations and instructions. For that purpose, it is necessary to be able to instruct a route even if the data storage formats of the maps stored in the center and the vehicle do not match.

In the above known apparatus, as disclosed in JP-A-2018-40712, an identified route is output as a list of links. Therefore, for example, in the control of an autonomous vehicle by the center as described above, when the route identified by the center is transmitted as instruction content to an autonomous vehicle that does not have a common map, the route cannot be restored on the autonomous vehicle side.

In view of the above, it is desired to have a technique for outputting route information that is sharable even among apparatuses that do not have common map information.

An embodiment according to the present disclosure will now be described with reference to the drawings. In the present embodiment, a case will be described in which the present disclosure is applied to a vehicle allocation service for autonomous vehicles.

Figure 1:
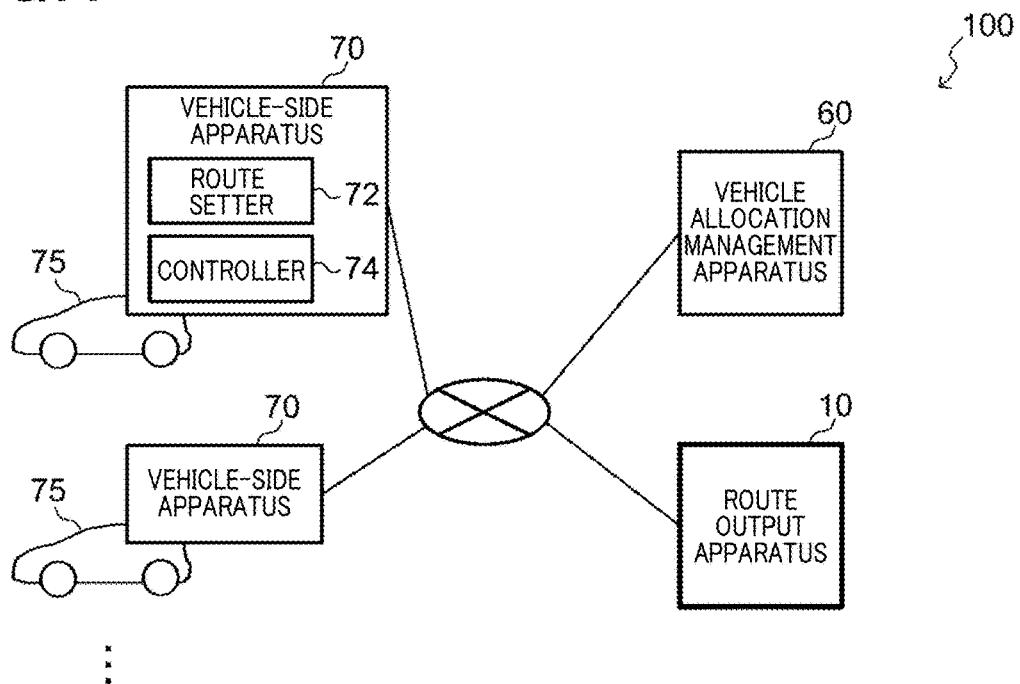
FIG. 1 is a schematic diagram illustrating a configuration of a route output system according to the present embodiment.

As illustrated in FIG. 1, a route output system 100 according to the present embodiment includes a route output apparatus 10 and a vehicle allocation management apparatus 60 arranged in a center that manages and operates a vehicle allocation service, and a vehicle-side apparatus 70 mounted to each of a plurality of vehicles 75. The route output apparatus 10, vehicle allocation management apparatus 60, and vehicle-side apparatus 70 are connected to one another via a network.

In the route output system 100, for example, a vehicle 75 used as a taxi, a ride share, or the like, under the management of the vehicle allocation management apparatus 60, operates automatically in accordance with route information output from the route output apparatus 10 or route information set by the vehicle-side apparatus 70.

When receiving a vehicle allocation request including a vehicle allocation request location (boarding location) from a user who uses the vehicle allocation service, the vehicle allocation management apparatus 60 allocates a vehicle 75 that can be allocated. Then, the vehicle allocation management apparatus 60 transmits, to the route output apparatus 10, the vehicle allocation request, communication destination information such as an address of the vehicle-side apparatus 70 mounted to the vehicle 75 which is allocated, and vehicle information including a vehicle location. Location information of the vehicle allocation request location and the vehicle location included in the vehicle allocation request is identified by a latitude and a longitude. In addition, as for the vehicle location, the vehicle allocation management apparatus 60 may acquire the location information measured by GPS (Global Positioning System) or the like included in the vehicle-side apparatus 70.

The vehicle-side apparatus 70 includes a route setter 72 that sets a route along which the vehicle 75 travels, and a controller 74 that controls autonomous driving of the vehicle 75 in accordance with the set route. Specifically, the route setter 72 stores map information that includes a list of links which represent the location and shape of each predetermined section of a road and represents a road network based on a connection relationship between the links. The route setter 72 sets a sequence (hereinafter referred to as a "link sequence") of an identification number of a link (hereinafter referred to as a "link number") indicating a route from the vehicle location to the vehicle allocation request location, based on the route information (details will be described later) received from the route output apparatus 10 and the map information.

Figure 2:
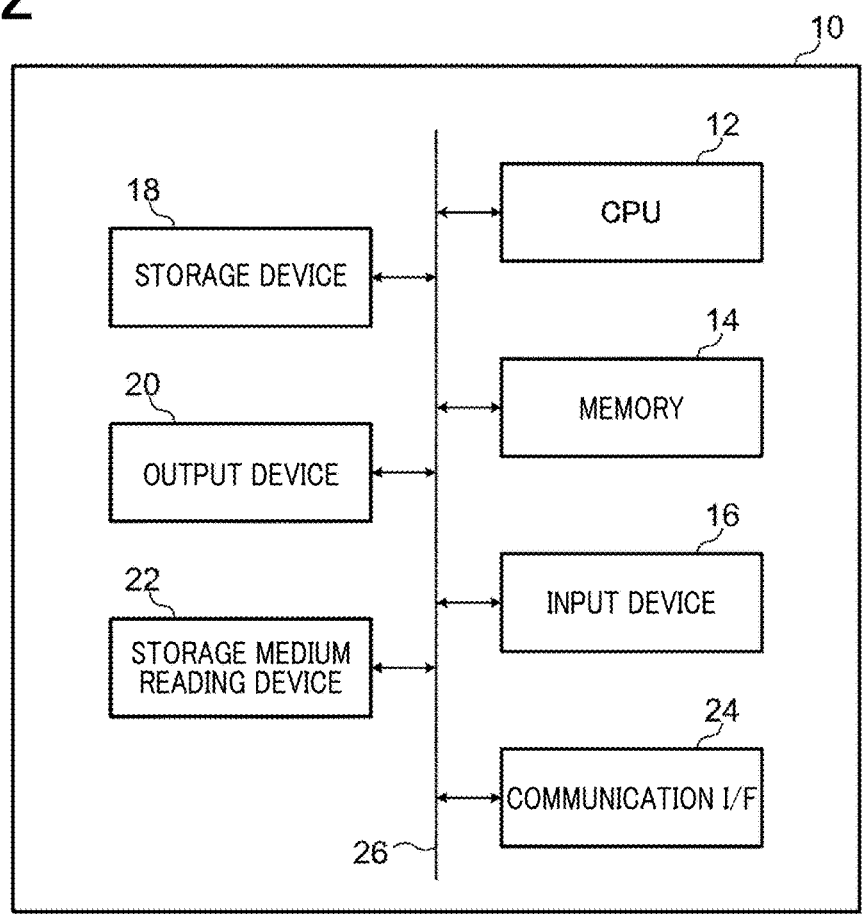
FIG. 2 is a block diagram illustrating a hardware configuration of a route output apparatus according to the present embodiment.

FIG. 2 illustrates a hardware configuration of the route output apparatus 10 according to the present embodiment. As illustrated in FIG. 2, the route output apparatus 10 includes a CPU (Central Processing Unit) 12, a memory 14, a storage device 16, an input device 18, an output device 20, a storage medium reading device 22, and a communication I/F (Interface) 24. The respective components are communicably connected with one another via a bus 26.

The storage device 16 stores one or more route output programs for executing a graph creation process and a route output process described later. The CPU 12 is a central processing unit and executes various programs and controls various components. That is, the CPU 12 reads a program from the storage device 16 and executes the program with use of the memory 14 as a work area. The CPU 12 controls each component and performs various processes in accordance with the programs stored in the storage device 16.

The memory 14 includes a random-access memory (RAM), and temporarily stores programs and data as a work area. The storage device 16 includes a read-only memory (ROM) and a hard disk drive (HDD) or a solid-state drive (SSD), and stores various programs including an operating system and various data.

The input device 18 is a device such as a keyboard or a mouse for performing various inputs. The output device 20 is a device for outputting various kinds of information, such as a display or a printer. A touch panel display may be employed as the output device 20 to function as the input device 18.

The storage medium reading device 22 reads data stored in various storage media such as a compact disk-read only memory (CD-ROM), a digital versatile disc-read only memory (DVD-ROM), a Blu-ray Disc, and a universal serial bus (USB) memory, and writes data into a storage medium.

The communication I/F 44 is an interface for communicating with another device, and for example, a standard such as Ethernet (registered trademark), fiber-distributed data interface (FDDI), or Wi-Fi (registered trademark) is used.

The vehicle allocation management apparatus 60 is implemented by an information processing device such as a personal computer or a server device. The vehicle-side apparatus 70 is implemented by an information processing device such as a personal computer. The hardware configurations of the vehicle allocation management apparatus 60 and the vehicle-side apparatus 70 are substantially the same as the hardware configuration of the route output apparatus 10 illustrated in FIG. 2, and thus the description thereof is omitted.

Figure 3:
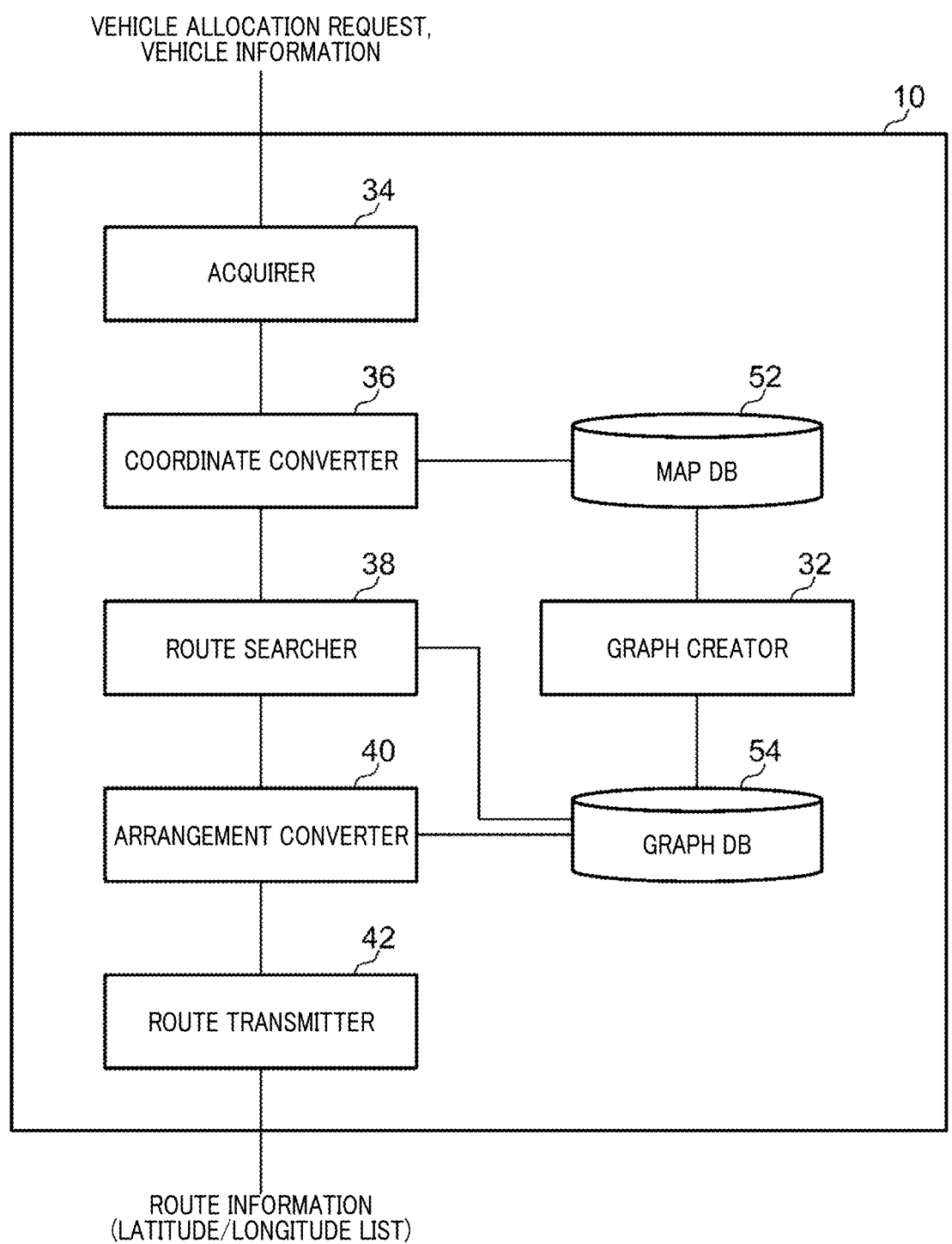
FIG. 3 is a functional block diagram of the route output apparatus according to the present embodiment.

Next, a functional configuration of the route output apparatus 10 according to the present embodiment will be described with reference to FIG. 3. As illustrated in FIG. 3, the route output apparatus 10 includes a graph creator 32, an acquirer 34, a coordinate converter 36, a route searcher 38, a thinning converter 40, and a route transmitter 42. In addition, a map database (DB) 52 and a graph DB 54 are stored in a predetermined storage area of the route output apparatus 10. Each functional unit is implemented by the CPU 12 illustrated in FIG. 2. The route searcher 38 is an example of the searcher of the present disclosure, the thinning converter 40 is an example of the converter of the present disclosure, and the route transmitter 42 is an example of the outputter of the present disclosure.

Here, the map DB 52 stores map information, and as described above, the map information includes a list of links that represent the location and shape of each predetermined section of a road, and represents a road network based on a connection relationship between the links. However, the map information carried by the route output apparatus 10 and the map information carried by the vehicle-side apparatus 70 mounted to each vehicle 75 are not always common. For example, as illustrated in FIG. 4, the map information carried by the route output apparatus 10 and the map information carried by the vehicle-side apparatus 70 differ in the method of assigning link numbers and the way of dividing the links, and thus the route information cannot be shared by a recording method using a link sequence.

In addition, in FIG. 4, Li (i=1, 2, . . . ) displayed together with each link is a link number of the link. Hereinafter, the link of a link number Li is described as "link Li". In FIG. 4, for example, even if the vehicle-side apparatus 70 receives route information "L3→L12→L1" from the route output apparatus 10, the vehicle-side apparatus 70 cannot restore the same route as the route searched by the route output apparatus 10.

Accordingly, in the present embodiment, as illustrated in FIG. 4, for example, the route output apparatus 10 and the vehicle-side apparatus 70 can share the route information even when the pre-stored map information is different. Hereinafter, each functional configuration and each DB will be described in detail.

FIG. 5 illustrates an example of the map DB 52. In the example of FIG. 5, the map DB 52 includes a link table 52A and an origin table 52B.

Figure 6:
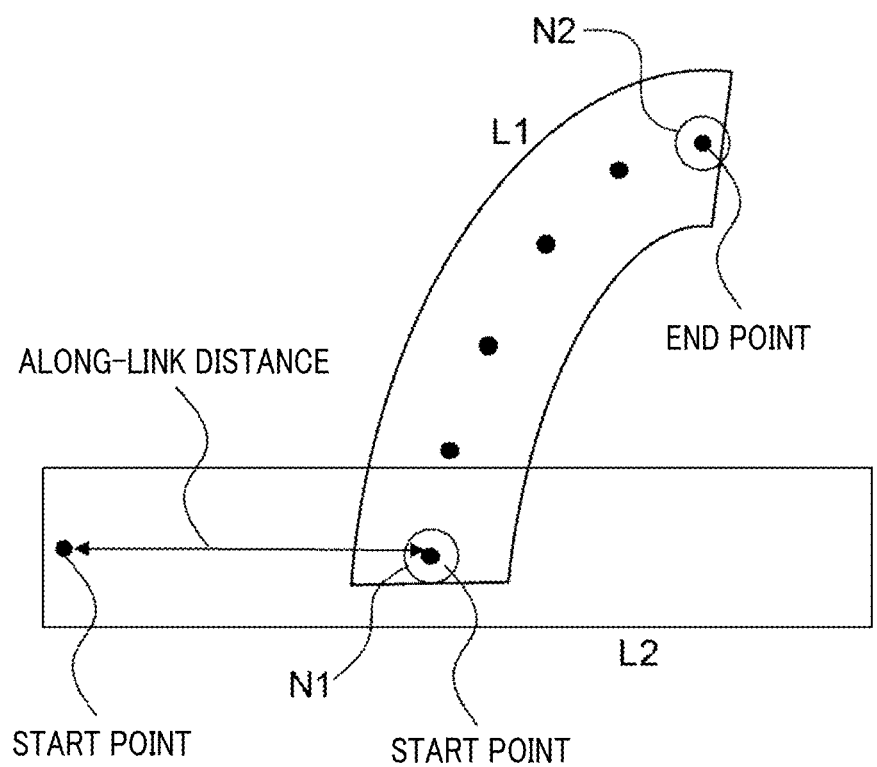
FIG. 6 is a diagram for explaining the structure of a link.

The link table 52A stores link information including a shape, a connection relationship, and a location of each link. As illustrated in FIG. 6, the shape of the link is expressed by connecting the center points (filled circles in FIG. 6) centered in the width direction of the link and arranged at locations where the curved shape of the link can be expressed. In addition, a direction indicating the traveling direction of the vehicle 75 is defined in the link, and the center point of the end portion on the starting point side in this direction is the "start point" and the center point of the end portion on the opposite side is the "end point".

In the link table 52A of FIG. 5, each column (each record) is link information about one link. Each link information includes a "link number", a "center point group list", a "list of direction vectors between center points", a "lane width list", a "start-point-connected link number", a "distance along start-point-connected link", an "end-point-connected link number", a "distance along end-point-connected link", and "lower left and upper right corner coordinates of the circumscribing grid (or bounding box)".

The "center point group list" is a list of coordinates of center points from the start point to the end point included in a corresponding link. The coordinates of the center point are represented by coordinates in a Cartesian coordinate system having an origin defined in the origin table 52B described later as [0, 0]. The "list of direction vectors between center points" is a list representing the relationship between adjacent center points as a vector from the center point on the start point side to the center point on the end point side. The "lane width list" is a width of the road (lane) indicated by the link, and is a list indicating a width of each lane when the link includes a plurality of lanes.

The "start-point-connected link number" is a link number of a link to which the start point is connected, and the "distance along start-point-connected link" is a distance expressed with the start point of the start-point-connected link as a starting point. In the example of FIG. 6, for the link L1, the start point of the link L1 is connected to the link L2, and thus the "start-point-connected link number" is "L2", and the "distance along start-point-connected link" is the distance from the start point of L2 to the start point of L1. The same applies to the "end-point-connected link number" and the "distance along end-point-connected link".

The "lower left and upper right corner coordinates of the circumscribing grid" are information for identifying the location of a link on a map, and are the lower left and upper right corner coordinates of the circumscribing grid of a link based on the origin defined in the origin table 52B described later. The coordinates are not limited to the lower left and upper right corners, but may be the coordinates of the upper left and lower right corners, or may be managed by the center coordinates of the circumscribing grid and the size of the circumscribing grid.

The origin table 52B stores "origin latitude/longitude" indicating the latitude and longitude of the location corresponding to an origin defined on the map represented by the Cartesian (or orthogonal) coordinate system.

The graph creator 32 creates a graph that includes a plurality of nodes and at least one link that connects the nodes and represents the map information stored in the map DB 52, and stores information indicating the created graph in the graph DB 54.

Specifically, the graph creator 32 sets the center points corresponding to the start point and the end point of each link included in the map information as nodes respectively, and assigns a node identification number (hereinafter, referred to as a "node number"). For example, as illustrated in FIG. 6, the graph creator 32 assigns a node number N1 to the start point of the link L1 and a node number N2 to the end point of the link L1. Hereinafter, the node of a node number Nj (j=1, 2, . . . ) is described as "node Nj".

In addition, the graph creator 32 calculates, for each node, coordinates on the map represented by the Cartesian coordinate system based on the "center point group list" and "lower left and upper right corner coordinates of the circumscribing grid" of the link table 52A and the "origin latitude/longitude" of the origin table 52B. In addition, the graph creator 32 creates a pair of a link number of a link connecting each node and an along-link distance of the node in the link, as information of a connection link. In the example of FIG. 6, since the node N1 is located at the start point of the link L1, a pair [L1, 0] is created. In addition, since the node N1 also corresponds to the center point in the middle of the link L2, if the along-link distance of this center point is 15, a pair [L2, 15] is also created.

In addition, the graph creator 32 creates an included node list in which the nodes included in each link are collected based on the information of the connection link. The included node list is a list of pairs of node numbers and the along-link distances of the nodes indicated by the node numbers.

Furthermore, the graph creator 32 sorts the nodes included in the included node list in ascending order of along-link distances, and creates an edge that connects adjacent nodes. The graph creator 32 assigns an edge identification number (hereinafter, referred to as an "edge number") to the created edge. Hereinafter, the edge having an edge number Ek (k=1, 2, . . . ) is described as "edge Ek". In addition, the graph creator 32 calculates a distance between a start point node and an end point node of the edge as an edge distance.

FIG. 7 illustrates an example of the graph DB 54. In the example of FIG. 7, the graph DB 54 includes a node table 54A, an along-link node table 54B, and an edge table 54C.

The node table 54A stores the node information of each node included in a graph. In the example of FIG. 7, each column (each record) is node information about one node. Each piece of node information includes information of a "node number", "coordinates", and a "connection link list", and the information calculated or created by the graph creator 32 is stored. The along-link node table 54B stores the included node list created by the graph creator 32 in association with the "link number" of each link.

The edge table 54C stores edge information of each edge included in the graph. In the example of FIG. 7, each column (each record) is one piece of edge information. Each piece of edge information includes information of an "edge number", a "start point node number", an "end point node number", and a "distance", and the information calculated or created by the graph creator 32 is stored.

The acquirer 34 acquires a vehicle allocation request and vehicle information transmitted from the vehicle allocation management apparatus 60. The acquirer 34 forwards the acquired vehicle allocation request and vehicle information to the coordinate converter 36.

The coordinate converter 36 converts the vehicle allocation request location and the vehicle location, which are identified by the latitude and the longitude, into information of a pair of a link number and an along-link distance.

Specifically, the coordinate converter 36 converts the latitude and longitude, which are the location information of the vehicle allocation request location and the vehicle location, into coordinates $\vec{p}$ of a Cartesian coordinate system whose origin is the "origin latitude/longitude" stored in the origin table 52B (in a drawing described later, "→" is added on top of "p"). Then, the coordinate converter 36 calculates the along-link distance in the link closest to the coordinates $\vec{p}$.

Figure 8:
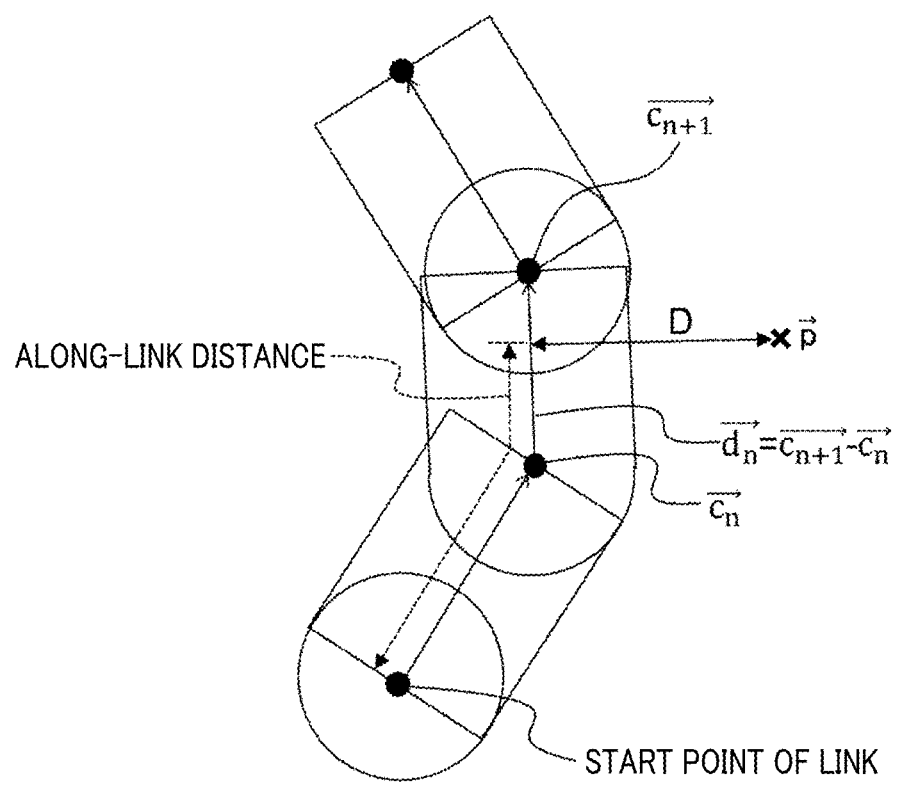
FIG. 8 is a diagram for explaining coordinate conversion.

For example, the coordinate converter 36 identifies a link in which the coordinates $\vec{p}$ are included in a grid specified based on the "lower left and upper right corner coordinates of the circumscribing grid" of the link table 52A and the "origin latitude/longitude" stored in the origin table 52B. As illustrated in FIG. 8, the coordinate converter 36 acquires, from the link table 52A, a direction vector between center points $\vec{d_n}$ (in the figure, "→" is added on top of "dn") for an nth center point $\vec{c_n}$ (in the figure, "→" is added on top of "cn"), and obtains a distance D between the direction vector between center points $\vec{d_n}$ and the coordinates $\vec{p}$. In addition, for the direction vector between center points $\vec{d_n}$ for which the distance D obtained for each direction vector between center points $\vec{d}$ is minimized, the coordinate converter 36 obtains an along-link distance at a location on the vector dn→ for which the distance from the coordinates p→ is D. Then, the coordinate converter 36 creates a pair of the link number of a corresponding link and the obtained along-link distance. The coordinate converter 36 transfers the created pair of the link number and the along-link distance to the route searcher 38.

The route searcher 38 uses a graph stored in the graph DB 54 to search for a route from the designated departure point to the arrival point. The route searcher 38 identifies as the departure point, the node immediately after the vehicle location among the included nodes of the link indicated by the link number, based on the pair of the link number and the along-link distance, which is converted from the latitude and longitude of the vehicle location. In addition, the route searcher 38 identifies as the arrival point, the node immediately before the vehicle allocation request location among the included nodes of the link indicated by the link number, based on the pair of the link number and the along-link distance, which is converted from the latitude and longitude of the vehicle allocation request location.

The route searcher 38 searches for a route from the departure point to the arrival point with use of a graph, by, for example, a method such as an existing shortest route search, obtains a link sequence indicating the searched route, and further obtains a route search result in the form of a node sequence in which the nodes included in the link sequence are arranged in order. The route searcher 38 transfers, to the thinning converter 40, the node sequence indicating a route search result and the location information of the vehicle location and the vehicle allocation request location.

The thinning converter 40 converts coordinates of a point on the graph identified based on the node sequence transferred from the route searcher 38 into a latitude and a longitude.

Here, it is conceivable that all the nodes included in the node sequence indicating the route search result could be converted into a latitude and a longitude and then output. However, in this case, since the amount of information increases, the load on the communication line increases. In particular, since the map information for autonomous driving is a high-precision map, when the map information is graphed, many nodes will be included to represent one intersection, and thus, the number of nodes included in the node sequence indicating the route search result will also increase.

Accordingly, in the present embodiment, the nodes included in the node sequence are thinned out to the minimum number that can uniquely determine the route, and then a point on the graph to be converted into a latitude and a longitude is identified.

Specifically, the thinning converter 40 identifies a point on the graph located, for example, at an intermediate point between nodes selected from the node sequence. When a node is connected to a plurality of links, if the node per se is included in the route information, which link should be selected cannot be uniquely determined, and thus a point between the nodes is identified.

In addition, when selecting a node from the node sequence, the thinning converter 40 selects, with regard to a dense area of nodes, one representative node of a node group included in the dense area. A dense area of nodes is at least one of an area in which a distance between adjacent nodes is a predetermined value or shorter and an area in which tracks (links) overlap in the map information. This is because if a plurality of nodes in the dense area are selected, which link should be selected cannot be uniquely determined. Moreover, the thinning converter 40 can select, as the representative node, a node closest to the departure point of the route in the dense area. Thus, whether the distance between the nodes is equal to or shorter than the predetermined value is sequentially determined from the node on the departure point side, and the representative node can be thereby easily selected from the dense area.

Furthermore, the thinning converter 40 can select, from the nodes included in the node sequence, a node connecting to two or more nodes via links. A node connecting to less than two nodes is excluded from the nodes included in the node sequence because it has no branching and is not important for specifying the route.

The thinning converter 40 identifies a point on the graph as described above. Specifically, the thinning converter 40 converts the finally selected node into a pair of a link number and an along-link distance with reference to the node table 54A. The thinning converter 40 converts the coordinates in the Cartesian coordinate system of the intermediate point between the locations indicated by the pair of the link number and the along-link distance, into a latitude and a longitude based on the "lower left and upper right corner coordinates of the circumscribing grid" of the link table 52A, the "origin latitude/longitude" of the origin table 52B. The thinning converter 40 creates route information in which the vehicle location is added to the beginning of a latitude/longitude list obtained by converting the coordinates of each point and the vehicle allocation request location is added to the end of the list, and transfers the route information to the route transmitter 42 together with the vehicle information.

The route transmitter 42 transmits the route information to the vehicle-side apparatus 70 indicated by the communication destination information included in the vehicle information.

The operation of the route output system 100 according to the present embodiment will now be described.

Figure 9:
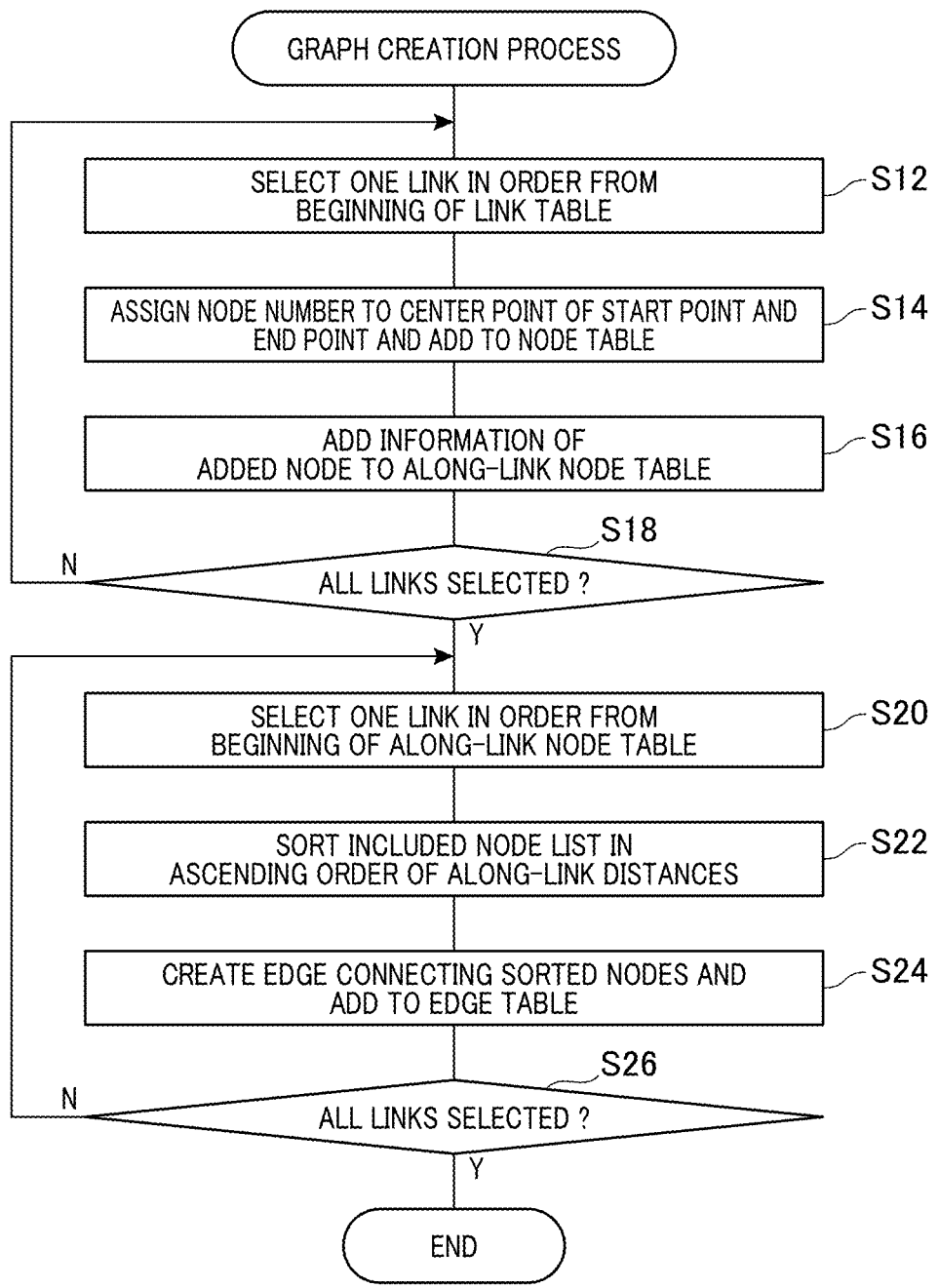
FIG. 9 is a flowchart illustrating an example of a graph creation process.

The route output apparatus 10 executes the graph creation process illustrated in FIG. 9, at the timing, for example, when the map information stored in the map DB 52 is updated, creates a graph from the map information, and stores the graph in the graph DB 54. Then, when receiving a vehicle allocation request including a vehicle allocation request location from a user who uses the vehicle allocation service, the vehicle allocation management apparatus 60 allocates a vehicle 75 that can be allocated. Then, the vehicle allocation management apparatus 60 transmits, to the route output apparatus 10, the vehicle allocation request, communication destination information such as an address of the vehicle-side apparatus 70 mounted to the vehicle 75 which is allocated, and vehicle information including a vehicle location. When the acquirer 34 of the route output apparatus 10 acquires the vehicle allocation request and the vehicle information from the vehicle allocation management apparatus 60, the route output apparatus 10 executes the route output process illustrated in FIG. 10. Hereinafter, the graph creation process and the route output process will be described in detail.

First, the graph creation process illustrated in FIG. 9 will be described.

In step S12, the graph creator 32 selects one link in order from the beginning of the link table 52A of the map DB 52.

Next, in step S14, the graph creator 32 sets a center point corresponding to a start point and an end point as a node respectively from the "center point group list" of the selected link, and assigns a node number to the node. In addition, the graph creator 32 calculates, for each node, coordinates on the map represented by the Cartesian coordinate system based on the "center point group list" and "lower left and upper right corner coordinates of the circumscribing grid" of the link table 52A and the "origin latitude/longitude" of the origin table 52B. Moreover, the graph creator 32 creates a pair of a link number of a link connecting each node and an along-link distance, as information of a connection link. Then, the graph creator 32 adds each of the assigned node number, calculated coordinates, and created connection link information, to the "node number", "coordinates", and "connection link list" of the node table 54A of the graph DB 54, respectively.

Next, in step S16, the graph creator 32 extracts, for each link, a pair of a node number and an along-link distance of the node indicated by the node number, based on the information of the connection link created in the abovementioned step S14. Then, the graph creator 32 adds the extracted pair to the "included node list" corresponding to the "link number" of a corresponding link in the along-link node table 54B.

Next, in step S18, the graph creator 32 determines whether all links have been selected from the link table 52A. If there is an unselected link, the process returns to step S12, and if all the links have been selected, the process proceeds to step S20.

In step S20, the graph creator 32 selects one link in order from the beginning of the along-link node table 54B.

Next, in step S22, the graph creator 32 sorts the node numbers included in the "included node list" of the selected link in the ascending order of along-link distances.

Next, in step S24, the graph creator 32 creates an edge connecting adjacent nodes in the sorted included node list, and assigns an edge number. In addition, the graph creator 32 calculates a distance between a start point node and an end point node of the edge as an edge distance. Then, the graph creator 32 adds each of the assigned edge number, node number of the start point node, node number of the end point node, and calculated distance, to the "edge number", "start point node number", "end point node number", and "distance" of the edge table 54C of the graph DB 54, respectively.

Next, in step S26, the graph creator 32 determines whether all links have been selected from the along-link node table 54B. If there is an unselected link, the process returns to step S20, and if all the links have been selected, the graph creation process ends.

Figure 10:
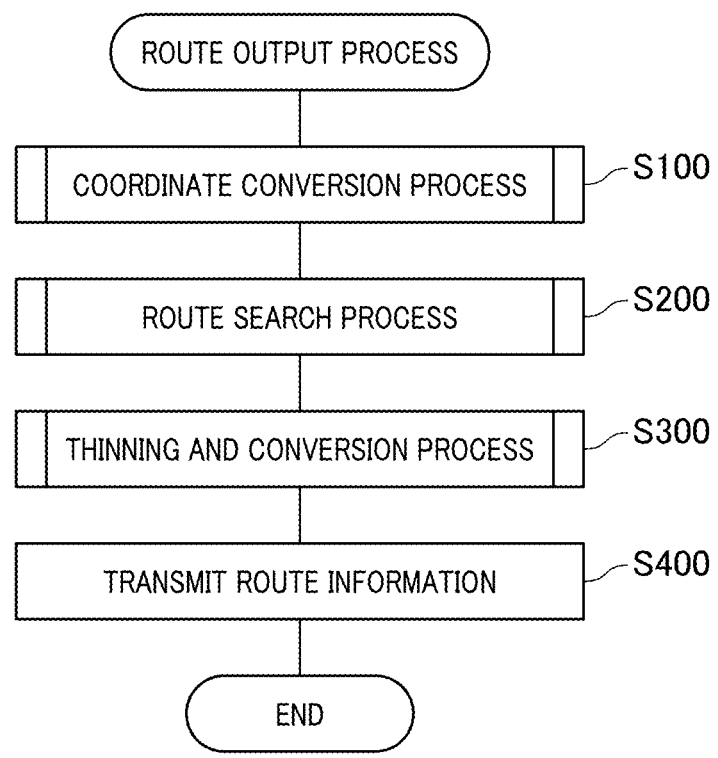
FIG. 10 is a flowchart illustrating an example of a route output process.

Next, the route output process illustrated in FIG. 10 will be described.

Figure 11:
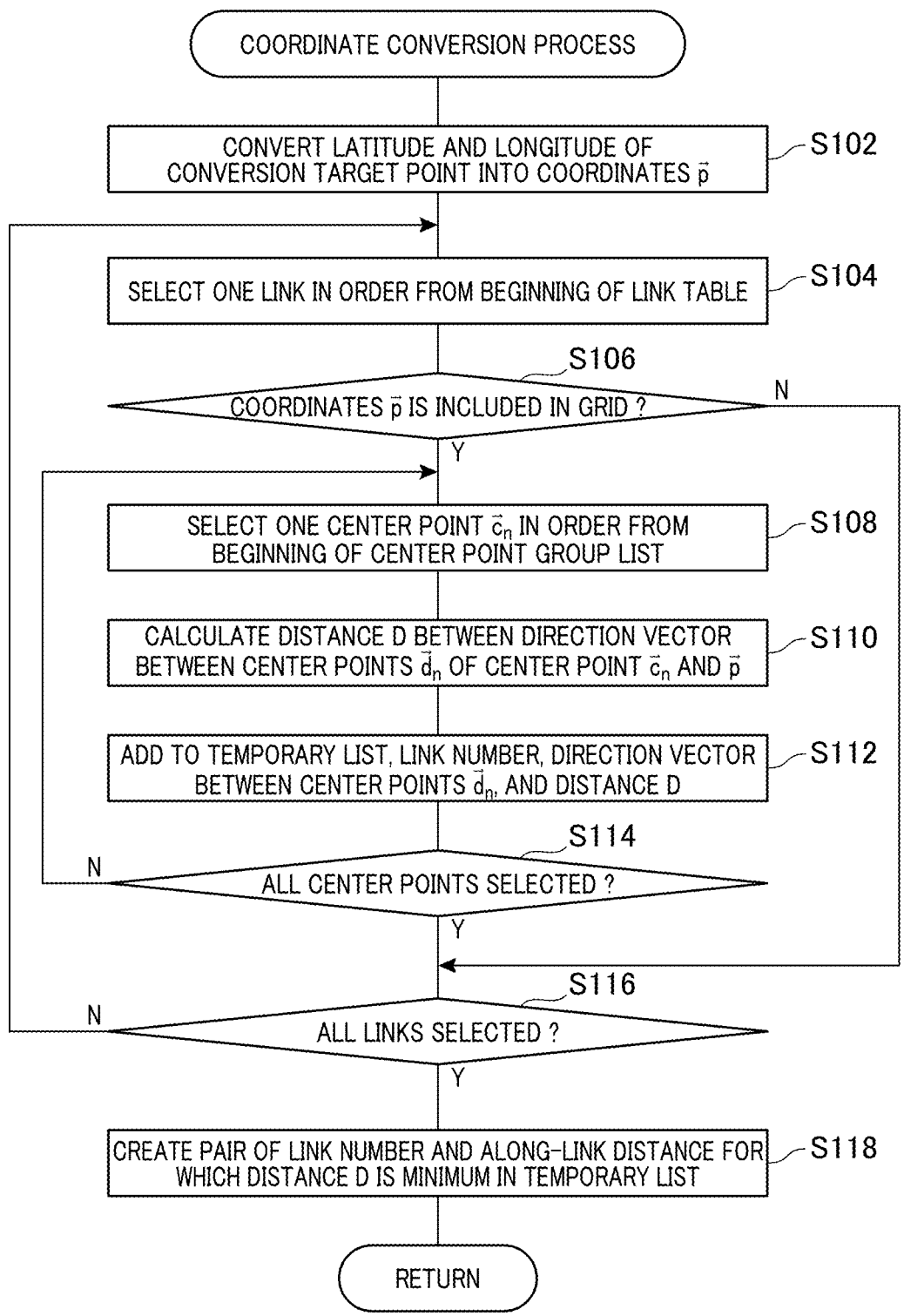
FIG. 11 is a flowchart illustrating an example of a coordinate conversion process.

In step S100, the coordinate converter 36 executes the coordinate conversion process illustrated in FIG. 11. Next, in step S200, the route searcher 38 executes the route search process illustrated in FIGS. 12 and 13. Next, in step S300, the thinning converter 40 and the route transmitter 42 execute the thinning and conversion process illustrated in FIGS. 14 and 15. Next, in step S400, the route transmitter 42 transmits the route information created in steps S100 to S300 to the vehicle-side apparatus 70 indicated by the communication destination information included in the vehicle information, and the route output process ends.

Hereinafter, each of the coordinate conversion process, route search process, and thinning and conversion process will be described in detail.

First, the coordinate conversion process illustrated in FIG. 11 will be described. The coordinate conversion process illustrated in FIG. 11 is executed for each of the vehicle location and the vehicle allocation request location, with the each as a conversion target point.

In step S102, the coordinate converter 36 converts the latitude and longitude, which are the location information of the conversion target point, into the coordinates $\vec{p}$ of the Cartesian coordinate system whose origin is the "origin latitude/longitude" stored in the origin table 52B.

Next, in step S104, the coordinate converter 36 selects one link in order from the beginning of the link table 52A of the map DB 52.

Next, in step S106, the coordinate converter 36 determines whether the coordinates $\vec{p}$ is included in a grid specified based on the "lower left and upper right corner coordinates of the circumscribing grid" of the selected link and the "origin latitude/longitude" stored in the origin table 52B. If the coordinates $\vec{p}$ is within the grid of the selected link, the process proceeds to step S108, and if the coordinates p is outside the grid, the process proceeds to step S116.

In step S108, the coordinate converter 36 selects one center point $\vec{cn}$ in the link table 52A of the map DB 52 in order from the beginning of the "center point group list" of the selected link.

Next, in step S110, the coordinate converter 36 acquires a direction vector between center points $\vec{dn}$ for a center point $\vec{cn}$ from the link table 52A, and calculates a distance D between the direction vector between center points $\vec{dn}$ and the coordinates $\vec{p}$.

Next, in step S112, the coordinate converter 36 adds, to a temporary list, the link number of the link selected in step S104, the direction vector between center points $\vec{dn}$ acquired in step S110, and the calculated distance D.

Next, in step S114, the coordinate converter 36 determines whether all the center points have been selected from the "center point group list". If there is an unselected center point, the process returns to step S108, and if all the center points have been selected, the process proceeds to step S116.

In step S116, the coordinate converter 36 determines whether all links have been selected from the link table 52A. If there is an unselected link, the process returns to step S104, and if all the links have been selected, the process proceeds to step S118.

In step S118, for the direction vector between center points $\vec{dn}$ for which a distance D is minimized, the coordinate converter 36 calculates, from the temporary list, an along-link distance at a location on the vector $\vec{dn}$ for which the distance from the coordinates $\vec{p}$ is D. The coordinate converter 36 creates a pair of the link number of the corresponding link and the calculated along-link distance, transfers the pair to the route searcher 38, and the coordinate conversion process ends.

Figure 12:
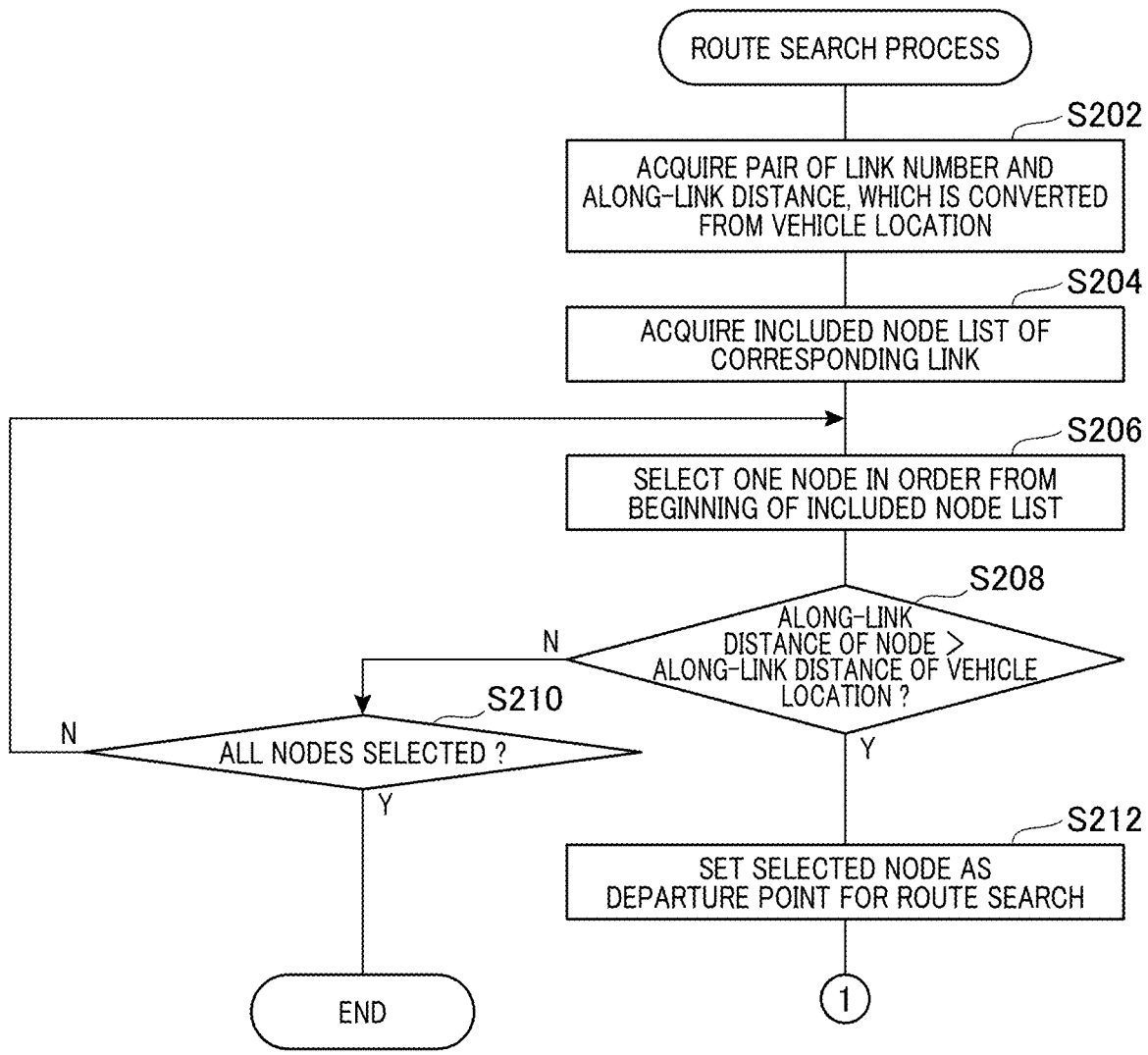
FIG. 12 is a flowchart illustrating an example of a route search process.

Next, the route search process illustrated in FIGS. 12 and 13 will be described.

In step S202, the route searcher 38 acquires the pair of the link number and the along-link distance, which is converted from the latitude and longitude of the vehicle location and transferred from the coordinate converter 36.

Next, in step S204, the route searcher 38 acquires, from the along-link node table 54B, the "included node list" of the link indicated by the link number of the acquired pair.

Next, in step S206, the route searcher 38 selects one node in order from the beginning of the acquired included node list.

Next, in step S208, the route searcher 38 determines whether the along-link distance of the selected node is larger than the along-link distance of the vehicle location. If the along-link distance of the selected node > the along-link distance of the vehicle location, the process proceeds to step S212, and if the selected node the vehicle location, the process proceeds to step S210.

In step S210, the route searcher 38 determines whether all the nodes have been selected from the included node list. If there is an unselected node, the process returns to step S206. If all the nodes have been selected, the condition for enabling the route search is not fulfilled, such as that the vehicle location is out of the range of the map information, and thus the route search process ends.

In step S212, the route searcher 38 sets the node selected in step S206 as a departure point for a route search.

Figure 13:
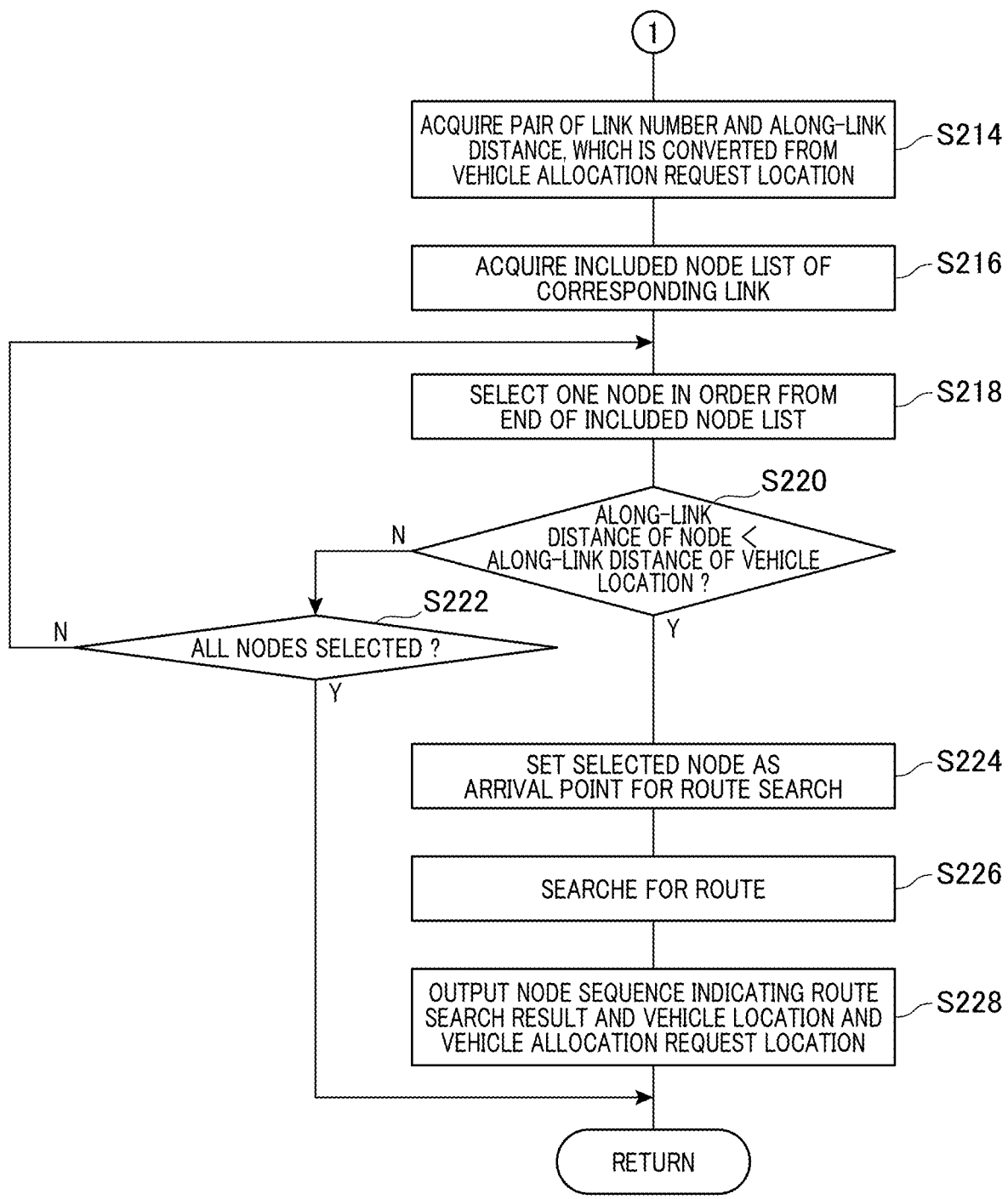
FIG. 13 is a flowchart illustrating an example of the route search process.

Next, in step S214 of FIG. 13, the route searcher 38 acquires the pair of the link number and the along-link distance, which is converted from the latitude and longitude of the vehicle allocation request location and transferred from the coordinate converter 36.

Next, in step S216, the route searcher 38 acquires, from the along-link node table 54B, the "included node list" of the link indicated by the link number of the acquired pair.

Next, in step S218, the route searcher 38 selects one node in reverse order from the end of the acquired included node list.

Next, in step S220, the route searcher 38 determines whether the along-link distance of the selected node is shorter than the along-link distance of the vehicle location. If the along-link distance of the selected node<the along-link distance of the vehicle location, the process proceeds to step S224, and if the along-link distance of the selected node≥the along-link distance of the vehicle location, the process proceeds to step S222.

In step S222, the route searcher 38 determines whether all the nodes have been selected from the included node list. If there is an unselected node, the process returns to step S218. If all the nodes have been selected, the condition for enabling the route search is not fulfilled, such as that the vehicle allocation request location is out of the range of the map information, and thus the route search process ends.

In step S224, the route searcher 38 sets the node selected in step S218 as an arrival point for the route search.

Next, in step S226, the route searcher 38 searches for a route from the departure point to the arrival point with use of a graph, by, for example, a method such as an existing shortest route search, and acquires a link sequence indicating the searched route.

Next, in step S228, the route searcher 38 transfers, to the thinning converter 40, the route search result in the form of a node sequence in which the nodes included in the acquired link sequence are arranged in order and the location information of the vehicle location and the vehicle allocation request location, and the route search process ends.

Figure 14:
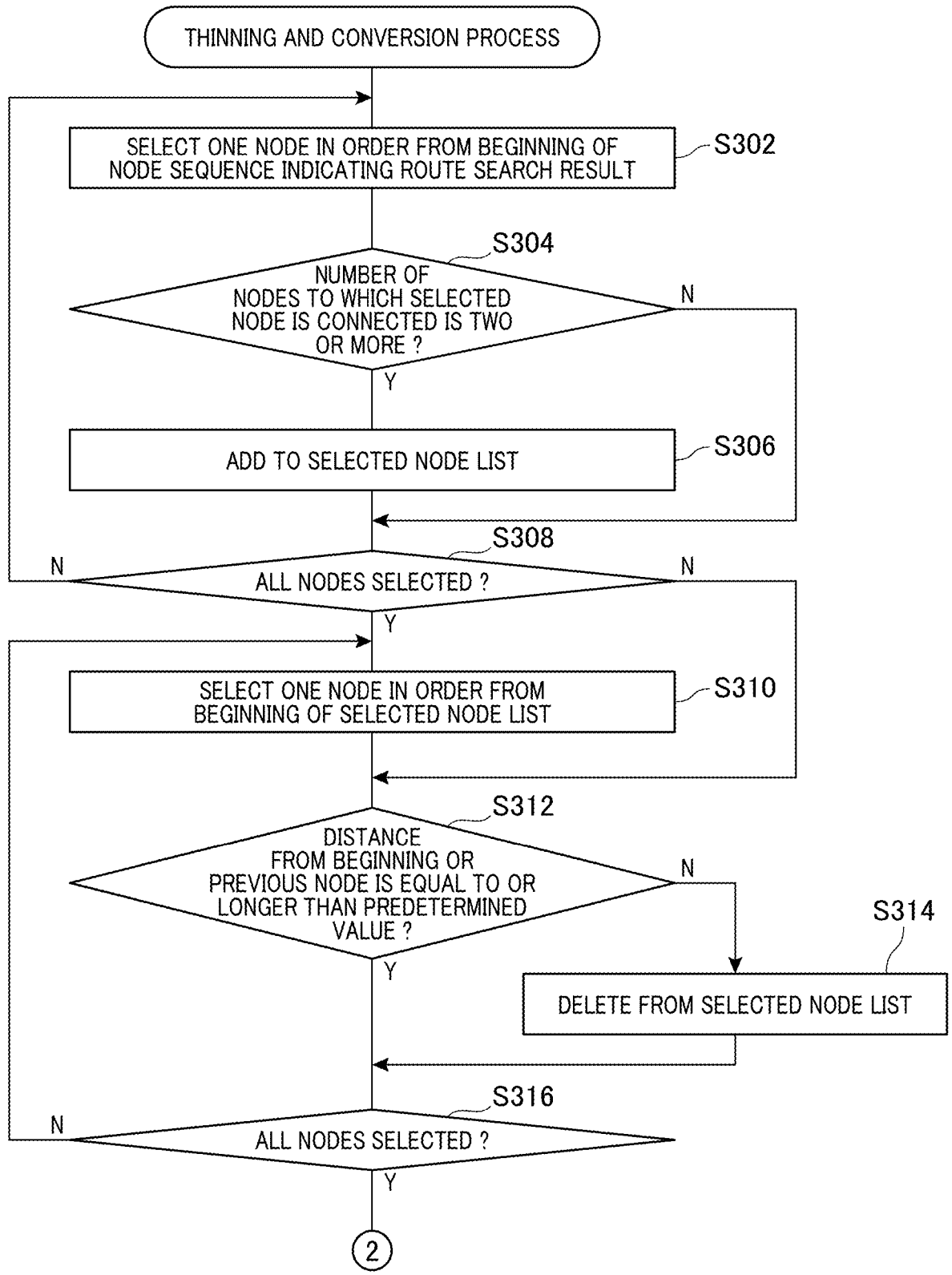
FIG. 14 is a flowchart illustrating an example of a thinning and conversion process.
Figure 15:
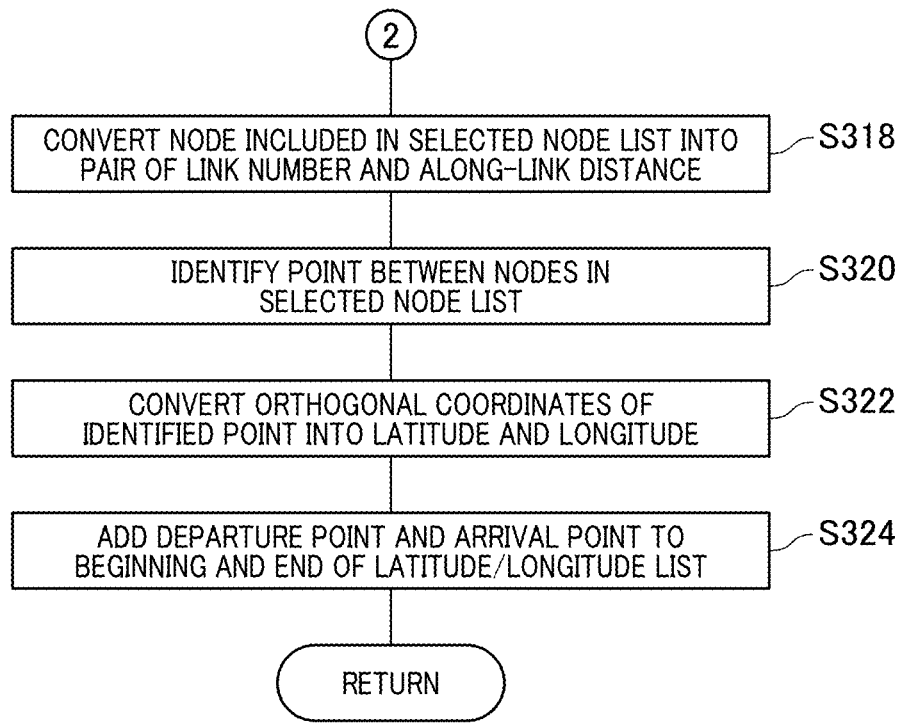
FIG. 15 is a flowchart illustrating an example of the thinning and conversion process.

Next, the thinning and conversion process illustrated in FIGS. 14 and 15 will be described.

Figure 16:
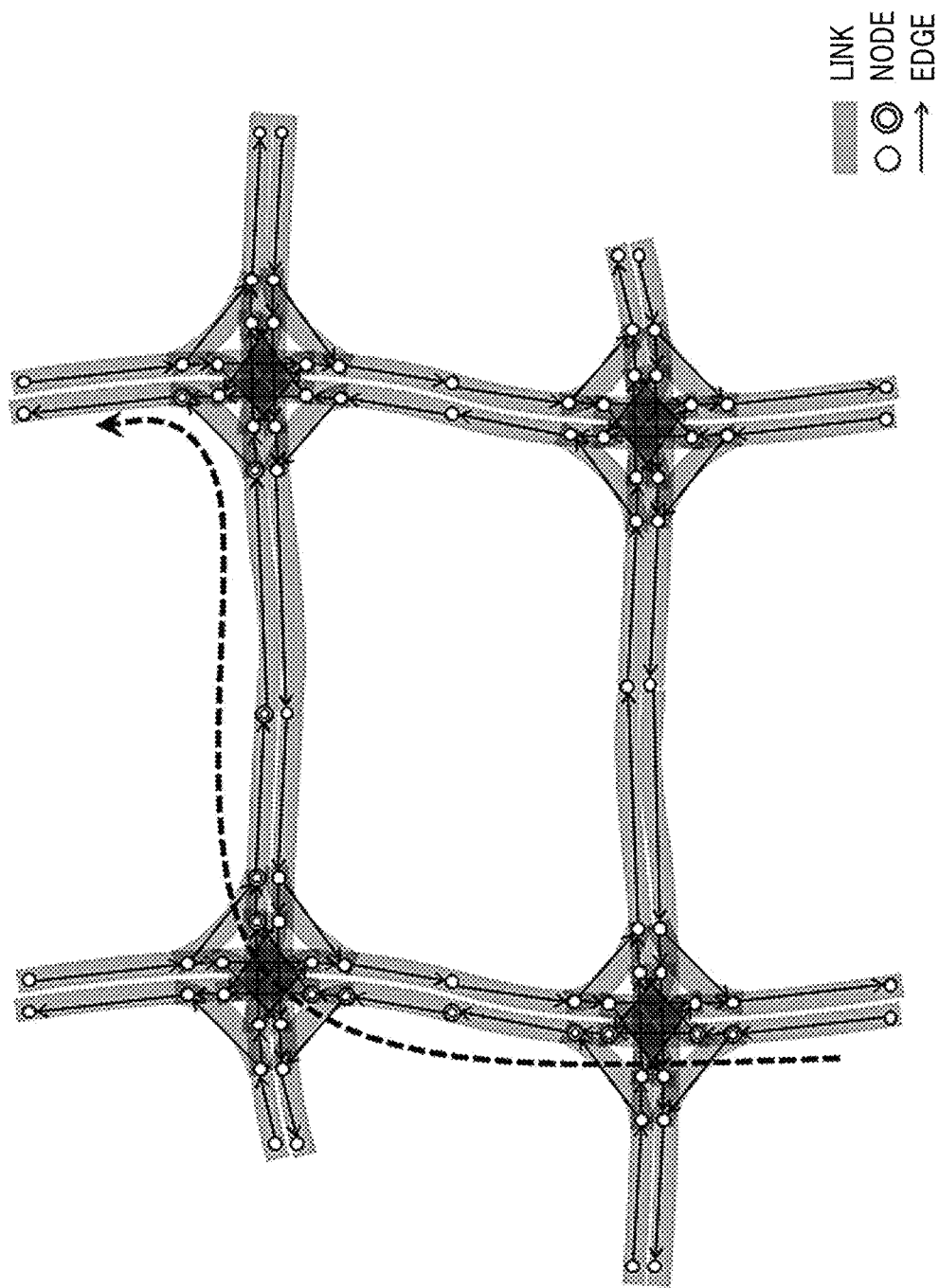
FIG. 16 is an example of a process of a thinning converter.

In step S302, the thinning converter 40 selects one node in order from the beginning of the node sequence indicating the route search result transferred from the route searcher 38. FIG. 16 illustrates an example of the node sequence at the time of this step. In FIG. 16, a dashed arrow indicates a searched route, a circle indicates a node, and in particular, a node indicated by a double circle is a node constituting a node sequence indicating a route search result. The same applies to FIGS. 17 to 19 below.

Next, in step S304, the thinning converter 40 determines whether the number of nodes to which the selected node is connected exceeds one. If the number is two or more, the process proceeds to step S306, and if the number is less than two, the process proceeds to step S308.

In step S306, the thinning converter 40 adds the node selected in step S302 to a selected node list.

Next, in step S308, the thinning converter 40 determines whether all the nodes have been selected from the node sequence indicating the route search result. If there is an unselected node, the process returns to step S302, and if all the nodes have been selected, the process proceeds to step S310.

Figure 17:
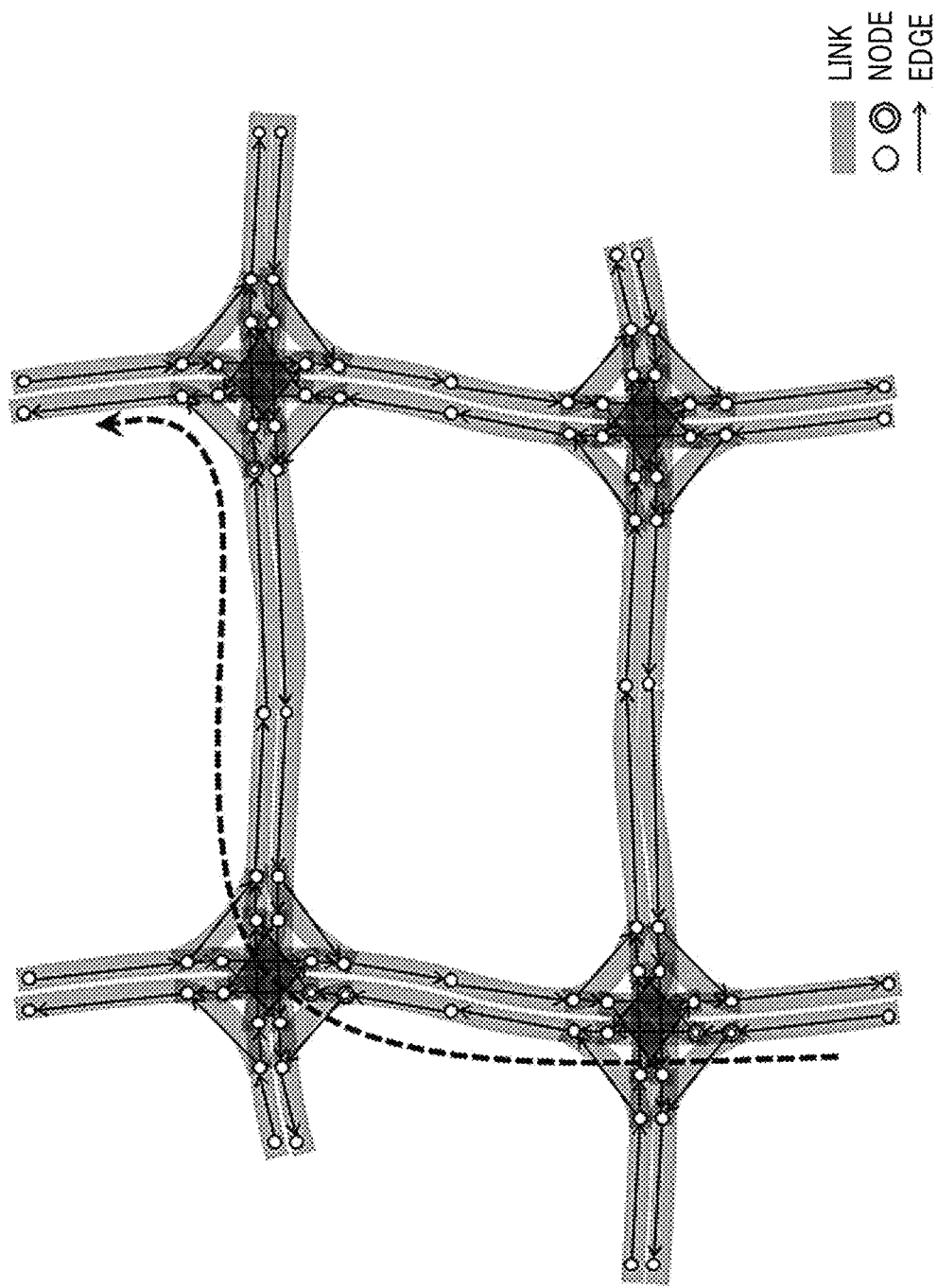
FIG. 17 is an example of a process of the thinning converter.

In step S310, the thinning converter 40 selects one node in order from the beginning of the selected node list. FIG. 17 illustrates an example of nodes (nodes indicated by double circles in FIG. 17) included in the selected node list at the time of this step.

Next, in step S312, the thinning converter 40 determines whether the selected node is a node whose distance from the beginning of the selected node list or the previous node is equal to or longer than a predetermined value. In either case, the process proceeds to step S316, and in neither case, the process proceeds to step S314.

In step S314, the thinning converter 40 deletes the node selected in step S310 from the selected node list.

Figure 18:
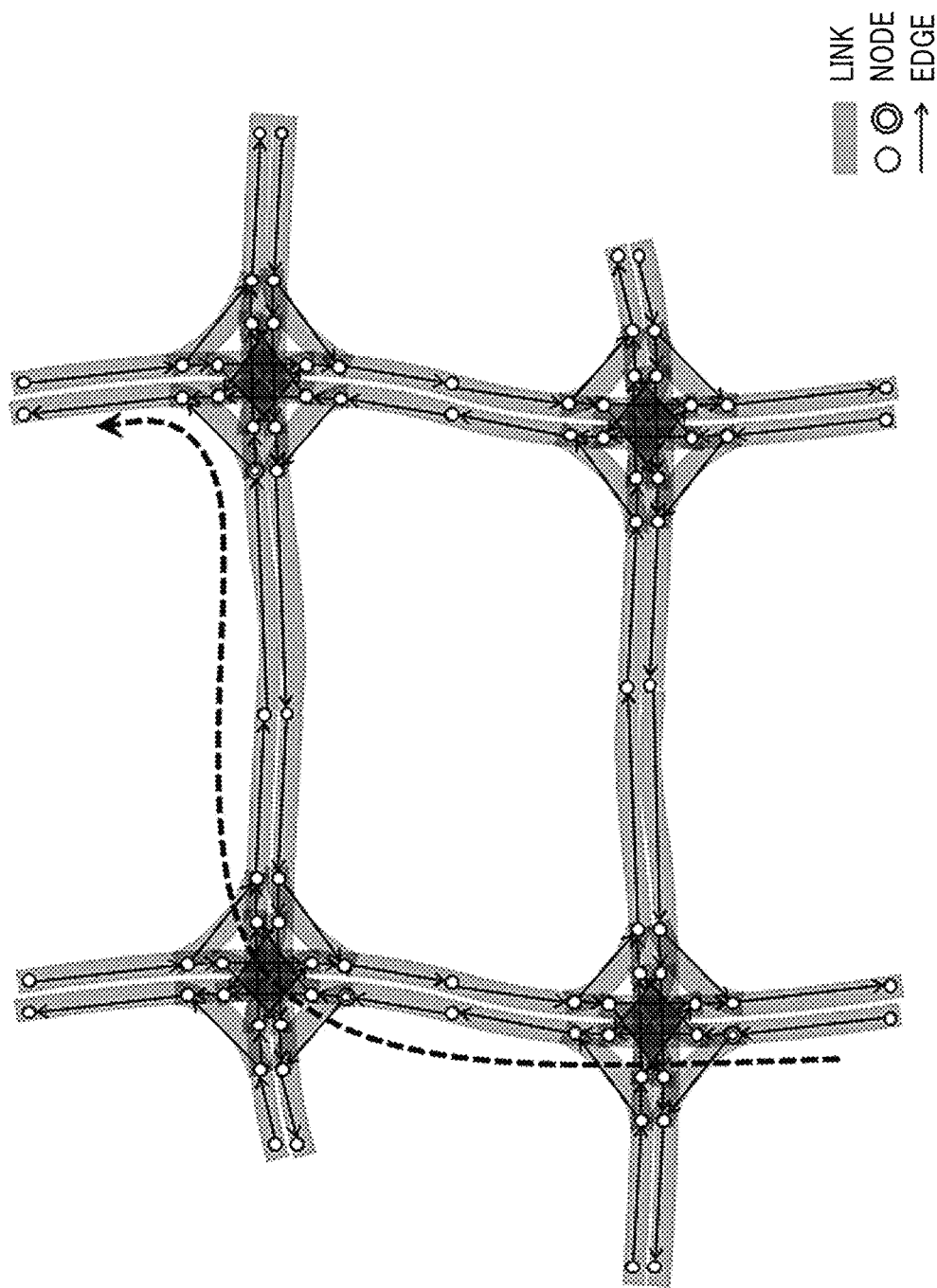
FIG. 18 is an example of a process of the thinning converter.

Next, in step S316, the thinning converter 40 determines whether all the nodes have been selected from the selected node list. If there is an unselected node, the process returns to step S310, and if all the nodes have been selected, the process proceeds to step S318 of FIG. 15. FIG. 18 illustrates an example of nodes (nodes indicated by double circles in FIG. 18) included in the selected node list when an affirmative determination is made in this step. By the processes of steps S312 and S314, the representative node on the departure point side of the route is selected from the dense area of nodes.

Next, in step S318, the thinning converter 40 converts each node included in the selected node list into a pair of a link number and an along-link distance with reference to the node table 54A.

Figure 19:
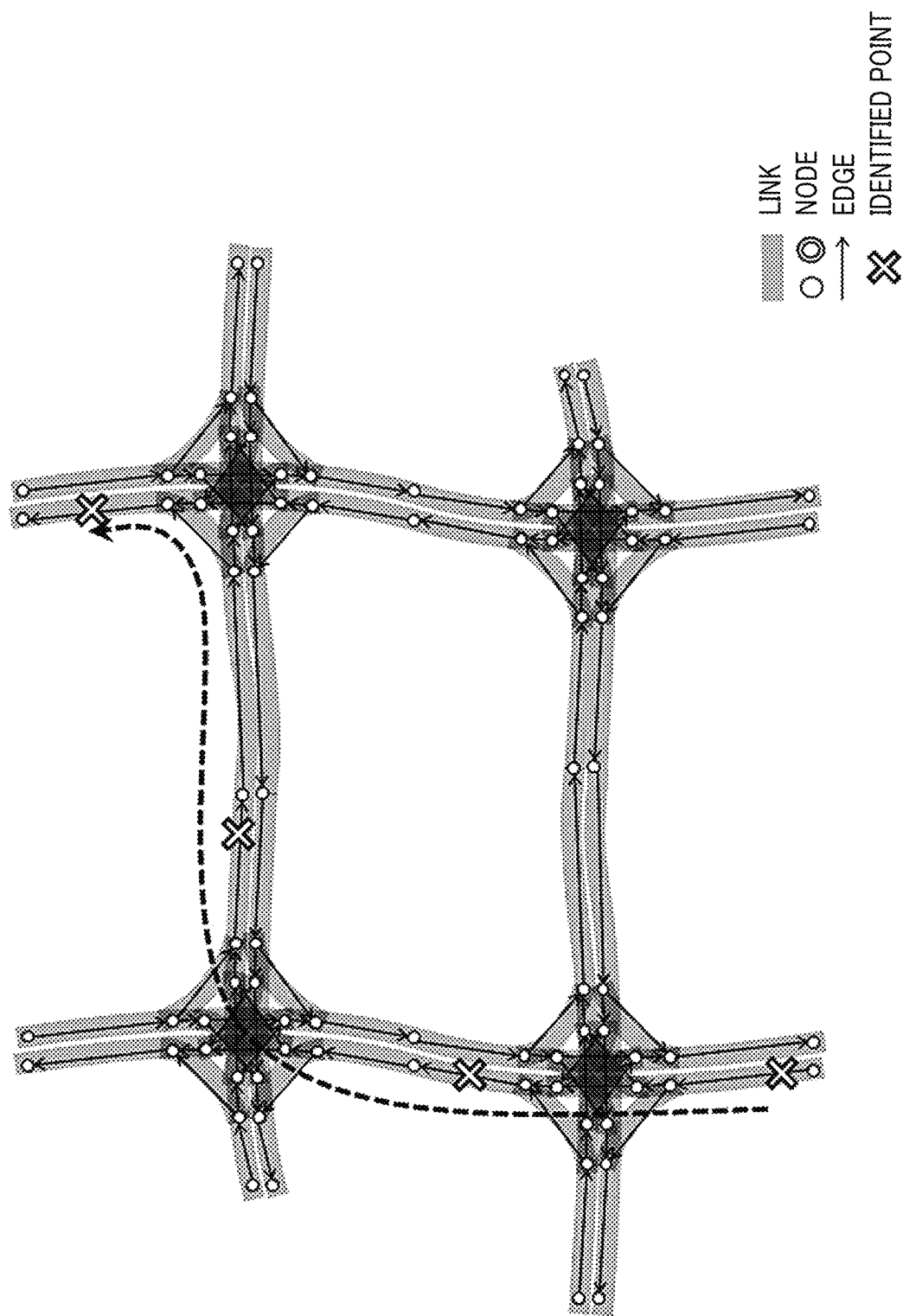
FIG. 19 is an example of a process of the thinning converter.

Next, in step S320, the thinning converter 40 identifies a point that is an intermediate point between the locations indicated by the pair of the link number and the along-link distance. FIG. 19 illustrates an example of the identified points. In FIG. 19, the identified points are indicated by white crosses.

Next, in step S322, the thinning converter 40 converts the coordinates in the Cartesian coordinate system of the identified point into a latitude and a longitude based on the "lower left and upper right corner coordinates of the circumscribing grid" of the link table 52A and the "origin latitude/longitude" of the origin table 52B.

Next, in step S324, the thinning converter 40 creates route information in which the vehicle location is added to the beginning of a latitude/longitude list obtained by converting the coordinates of each point and the vehicle allocation request location is added to the end of the list, and transfers the route information to the route transmitter 42 together with the vehicle information, and the thinning and conversion process ends.

In the vehicle-side apparatus 70, the route setter 72 processes the received route information of the latitude/longitude list in the same manner as the coordinate converter 36 to convert the route information into a link sequence indicating a route from the vehicle location to the vehicle allocation request location. If a continuous link sequence cannot be obtained only by the latitude and longitude included in the route information, the route setter 72 may search for a route that passes through a point indicated by the latitude and longitude included in the route information by a known method.

As described above, in the route output system according to the present embodiment, the route output apparatus creates a graph including a plurality of nodes and at least one link connecting the nodes from map information, and acquires a route from a designated departure point to an arrival point in a node sequence. Then, the route output apparatus converts the coordinates of a point on the graph identified based on the node sequence into a latitude and a longitude, and outputs the route information indicated by the latitude and longitude to the vehicle-side apparatus. Thus, even when the route output apparatus and the vehicle-side apparatus do not have common map information, the route information can be shared.

In addition, the route output apparatus according to the present embodiment converts, into a latitude and a longitude, the coordinates of a point on the graph located, for example, at an intermediate point between nodes selected from the node sequence indicating a route search result. Furthermore, when selecting a node from the node sequence, for the dense area of nodes, one representative node of the node group included in the dense area or a node to which two or more nodes are connected is selected, thereby thinning out nodes, and then a point on the graph is identified. Thus, the link can be uniquely identified from the latitude and the longitude, the amount of route information can be reduced, and the load on the communication line between the route output apparatus and the vehicle-side apparatus can be reduced.

In the above embodiment, a case has been described in which, in a vehicle allocation service, in response to a user's vehicle allocation request, route information is output when a vehicle is allocated to a location (boarding location) requested by the user. However, the present disclosure is not limited to this. The present disclosure may be applied to the route information to a destination after the user boards the vehicle. In this case, if the user transmits the destination to the vehicle allocation management apparatus in advance or at the time of riding, and the vehicle allocation management apparatus may notify the route output apparatus of the location information of the destination together with vehicle information including a vehicle location. The route output apparatus may output the route information from the vehicle location to the destination as is the case with the route information from the vehicle location to the vehicle allocation request location in the above embodiment.

In addition, in the above embodiment, a case where the present disclosure is applied to the vehicle allocation service by autonomous driving has been described. However, the route output apparatus according to the present disclosure can also be applied to a normal route search in a general vehicle or the like. Thus, a user can request route information from the vehicle side even for a route output apparatus that does not have a common map. Therefore, a flexible use is possible, such as changing the request destination of route information in accordance with the purpose.

In addition, the route output process executed by the CPU by reading the software (program) in the above embodiment may be executed by various processors other than the CPU. In this case, as the processor, a dedicated electrical circuit or the like that is a processor having a circuit configuration exclusively designed to execute a specific process, such as a programmable logic device (PLD) whose circuit configuration can be changed after manufacturing such as a field-programmable gate array (FPGA) or an application specific integrated circuit (ASIC), is exemplified. Moreover, the graph creation process and the route output process may be executed by one of these various processors, or a combination of two or more processors of the same type or different types (for example, a plurality of FPGAs and a combination of a CPU and a FPGA). Furthermore, the hardware structure of these various processors is, more specifically, an electric circuit in which circuit elements such as semiconductor elements are combined.

In addition, in the above embodiment, a mode in which the route output program is stored (installed) in a storage unit in advance has been described, but the present disclosure is not limited to this. The program may be provided in a form stored in a non-transitory tangible storage medium such as a CD-ROM, a DVD-ROM, a Blu-ray Disc, and a USB memory. Furthermore, the program may be downloaded from an external apparatus via a network.

What is claimed is:

1. A route output apparatus comprising:
   a non-transitory memory storing one or more computer programs; and
   a processor executing the one or more computer programs to:
   search for a route from a designated departure point to an arrival point with use of a graph including a plurality of nodes and at least one link connecting the nodes and representing map information;
   select, from a sequence of nodes representing the searched route, a minimum number of nodes that determine the route, each node of the minimum number of nodes being connected to two or more nodes via the links;
   create a point on the graph between each pair of consecutive nodes of the selected minimum number of nodes along the searched route;
   convert coordinates of each created point into a latitude and a longitude to represent the searched route using only the latitude and the longitude of the respective created point on the graph between each pair of consecutive nodes of the selected minimum number of nodes along the searched route; and
   output information representing the searched route using only the latitude and longitude for each created point on the graph.

2. The route output apparatus according to claim 1, in response to there being a dense area of nodes, the processor selects a representative node of a node group included in the dense area.

3. The route output apparatus according to claim 2, wherein the processor selects, as the representative node, a node closest to the departure point in the dense area.

4. The route output apparatus according to claim 2, wherein the dense area is at least one of an area in which a distance between adjacent nodes is a predetermined value or shorter and an area in which tracks overlap in the map information.

5. The route output apparatus according to claim 1, wherein the point on the graph located between each pair of consecutive nodes of the selected minimum number of nodes along the searched route is a middle point on the graph located between the pair of consecutive nodes.

6. A route output method comprising:
   searching a route from a designated departure point to an arrival point with use of a graph including a plurality of nodes and at least one link connecting the nodes and representing map information;
   select, from a sequence of nodes representing the searched route, a minimum number of nodes that determine the route, each node of the minimum number of nodes being connected to two or more nodes via the links;
   create a point on the graph between each pair of consecutive nodes of the selected minimum number of nodes along the searched route;

converting coordinates of each created point into a latitude and a longitude to represent the searched route using only the latitude and the longitude of the respective created point on the graph between each pair of consecutive nodes of the selected minimum number of nodes along the searched route; and outputting information representing the searched route using only the calculated latitude and longitude for each created point on the graph.

7. The route output method according to claim 6, wherein the converting comprises, in response to there being a dense area of nodes, selecting a representative node of a node group included in the dense area.

8. The route output method according to claim 7, wherein the converting comprises selecting, as the representative node, a node closest to the departure point in the dense area.

9. The route output method according to claim 7, wherein the dense area is at least one of an area in which a distance between adjacent nodes is a predetermined value or shorter and an area in which tracks overlap in the map information.

10. The route output method according to claim 6, wherein the point on the graph located between each pair of consecutive nodes of the selected minimum number of nodes along the searched route is a middle point on the graph located between the pair of consecutive nodes.

11. A non-transitory computer-readable medium comprising instructions configured to cause a processor to:

search for a route from a designated departure point to an arrival point with use of a graph including a plurality of nodes and at least one link connecting the nodes and representing map information;

select, from a sequence of nodes representing the searched route, a minimum number of nodes that determine the route, each node of the minimum number of nodes being connected to two or more nodes via the links;

create a point on the graph between each pair of consecutive nodes of the selected minimum number of nodes along the searched route;

convert coordinates of each created point into a latitude and a longitude to represent the searched route using only the latitude and the longitude of the respective created point on the graph between each pair of consecutive nodes of the selected minimum number of nodes along the searched route; and output information representing the searched route using only the calculated latitude and longitude for each created point on the graph.

12. The route output apparatus according to claim 1, wherein the route output apparatus is external of a vehicle, and the information representing the searched route is output to the vehicle.

\* \* \* \* \*